United States Patent
Haggar et al.

(10) Patent No.: US 9,275,115 B2
(45) Date of Patent: Mar. 1, 2016

(54) CORRELATING CORPUS/CORPORA VALUE FROM ANSWERED QUESTIONS

(71) Applicant: International Business Machines Corporation, Armonk, NY (US)

(72) Inventors: Peter F. Haggar, Raleigh, NC (US); Dane A. Johnson, Townsend, MA (US); Stephan J. Roorda, Fuquay-Varina, NC (US); Richard L. Stillwell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/943,067

(22) Filed: Jul. 16, 2013

(65) Prior Publication Data

US 2015/0026163 A1 Jan. 22, 2015

(51) Int. Cl.
*G06F 17/30* (2006.01)
(52) U.S. Cl.
CPC ...... *G06F 17/3053* (2013.01); *G06F 17/30654* (2013.01)
(58) Field of Classification Search
CPC .................. G06F 17/3053; G06F 17/30654
USPC .......................................................... 707/723
See application file for complete search history.

(56) References Cited

U.S. PATENT DOCUMENTS

| 6,904,428 | B2 | 6/2005 | Frieder et al. | |
|---|---|---|---|---|
| 2006/0184517 | A1* | 8/2006 | Anderson et al. | 707/3 |
| 2008/0040114 | A1* | 2/2008 | Zhou et al. | 704/257 |
| 2009/0287678 | A1* | 11/2009 | Brown et al. | 707/5 |
| 2009/0292687 | A1 | 11/2009 | Fan et al. | |

(Continued)

FOREIGN PATENT DOCUMENTS

| CN | 102236677 A | 11/2011 |
|---|---|---|
| EP | 1503338 A3 | 12/2005 |
| WO | WO 2009/140473 A1 | 11/2009 |

OTHER PUBLICATIONS

PCT Notification of Transmittal of the International Search Report and the Written Opinion of the International Searching Authority, or the Declaration (PCT/ISA/220), the International Search Report (PCT/ISA/210) and the Written Opinion of the International Searching Authority (PCT/ISA/237), dated Sep. 28, 2014, 12 pages.

(Continued)

*Primary Examiner* — Joshua Bullock
(74) *Attorney, Agent, or Firm* — Stephen R. Tkacs; Stephen J. Walder, Jr.; Reza Sarbakhsh

(57) ABSTRACT

Mechanisms are provided for dynamically selecting a subset of candidate answer sources for use by a question and answer (QA) system. The QA system receives an input question for which an answer is sought and generates one or more queries based on the input question. The QA system selects a subset of candidate answer sources, from a group of candidate answer sources, based on a ranked listing of candidate answer sources. The ranked listing of candidate answer sources is generated based on characteristics of previous candidate answers generated by the QA system for previously input questions. The QA system applies the one or more queries to the subset of candidate answer sources and generates at least one candidate answer for the input question based on results of applying the one or more queries to the subset of candidate answer sources.

19 Claims, 6 Drawing Sheets

(56) References Cited

U.S. PATENT DOCUMENTS

| | | | |
|---|---|---|---|
| 2010/0179927 A1 | 7/2010 | Meher et al. | |
| 2010/0191686 A1* | 7/2010 | Wang et al. | 706/46 |
| 2011/0066587 A1 | 3/2011 | Ferrucci et al. | |
| 2011/0125734 A1* | 5/2011 | Duboue et al. | 707/723 |
| 2011/0246465 A1* | 10/2011 | Koister et al. | 707/737 |
| 2012/0016887 A1 | 1/2012 | Oldham et al. | |
| 2012/0078895 A1 | 3/2012 | Chu-Carroll et al. | |
| 2012/0078902 A1 | 3/2012 | Duboue et al. | |
| 2012/0158678 A1 | 6/2012 | McGraw et al. | |
| 2013/0007055 A1 | 1/2013 | Brown et al. | |
| 2013/0018652 A1 | 1/2013 | Ferrucci et al. | |
| 2013/0018876 A1* | 1/2013 | Chu-Carroll et al. | 707/723 |
| 2013/0066886 A1* | 3/2013 | Bagchi et al. | 707/749 |
| 2013/0144890 A1* | 6/2013 | Liu | 707/749 |

OTHER PUBLICATIONS

U.S. Appl. No. 14/444,690, filed Dec. 8, 2014, 1 page.

"SpamBayes", http://spambayes.sourceforge.net/, retrieved from the internet on May 8, 2014, 4 pages.

Han, Eui-Hong et al., "Centroid-Based Document Classification: Analysis & Experiment Results", University of Minnesota, Department of Computer Science/ Army HPC Research Center, Technical Report #00-017, http://lvk.cs.msu.su/~bruzz/articles/classification/han00centroidbased.pdf, Mar. 6, 2000, 15 pages.

High, Rob, "The Era of Cognitive Systems: An Inside Look at IBM Watson and How it Works", IBM Corporation, Redbooks, 2012, 16 pages.

Yuan, Michael J., "Watson and healthcare", IBM developerWorks, IBM Corporation, Apr. 12, 2011, 14 pages.

* cited by examiner

400

```
┌─────────────────────────────────────────────────────────────────┐
│  IMPORT A DOCUMENT HAVING A SET OF QUESTIONS BASED ON THE CONTENT │
│                       OF THE DOCUMENT                             │
│                            405                                    │
└─────────────────────────────────────────────────────────────────┘
                                │
                                ▼
┌─────────────────────────────────────────────────────────────────┐
│     AUTOMATICALLY CREATE A CANDIDATE QUESTION FROM THE CONTENT    │
│                            410                                    │
└─────────────────────────────────────────────────────────────────┘
                                │
                                ▼
┌─────────────────────────────────────────────────────────────────┐
│   AUTOMATICALLY GENERATE ANSWERS FOR THE SET OF QUESTIONS AND     │
│            CANDIDATE QUESTION USING THE CONTENT                   │
│                            415                                    │
└─────────────────────────────────────────────────────────────────┘
                                │
                                ▼
┌─────────────────────────────────────────────────────────────────┐
│  PRESENT THE SET OF QUESTIONS, CANDIDATE QUESTION, AND ANSWERS TO │
│           THE CONTENT CREATOR FOR VERIFICATION                    │
│                            420                                    │
└─────────────────────────────────────────────────────────────────┘
                                │
                                ▼
┌─────────────────────────────────────────────────────────────────┐
│        STORE THE VERIFIED SET OF QUESTIONS IN THE DOCUMENT        │
│                            425                                    │
└─────────────────────────────────────────────────────────────────┘
```

*FIG. 4*

CORRELATING CORPUS/CORPORA VALUE FROM ANSWERED QUESTIONS

BACKGROUND

The present application relates generally to an improved data processing apparatus and method and more specifically to mechanisms for correlating corpus/corpora value from answered questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

U.S. Patent Application Publication No. 2013/0018652 discloses a mechanism for diffusing evidence among candidate answers during question answering so as to identify a relationship between a first candidate answer and a second candidate answer, wherein the candidate answers are generated by a question-answering computer process, the candidate answers have associated supporting evidence, and the candidate answers have associated confidence scores. All or some of the evidence may be transferred from the first candidate answer to the second candidate answer based on the identified relationship. A new confidence score may be computed for the second candidate answer based on the transferred evidence.

SUMMARY

In one illustrative embodiment, a method, in a data processing system comprising a processor and a memory, for dynamically selecting a subset of candidate answer sources for use by a question and answer (QA) system implemented by the data processing system. The method comprises receiving, by the QA system implemented by the data processing system, an input question for which an answer is sought and generating, by the QA system, one or more queries based on the input question. The method further comprises selecting a subset of candidate answer sources, from a group of candidate answer sources, based on a ranked listing of candidate answer sources. The ranked listing of candidate answer sources is generated based on characteristics of previous candidate answers generated by the QA system for previously input questions. In addition, the method comprises applying the one or more queries to the subset of candidate answer sources and generating at least one candidate answer for the input question based on results of applying the one or more queries to the subset of candidate answer sources.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart diagram of one embodiment of a method for question/answer creation for a document;

DETAILED DESCRIPTION

Figure 1:
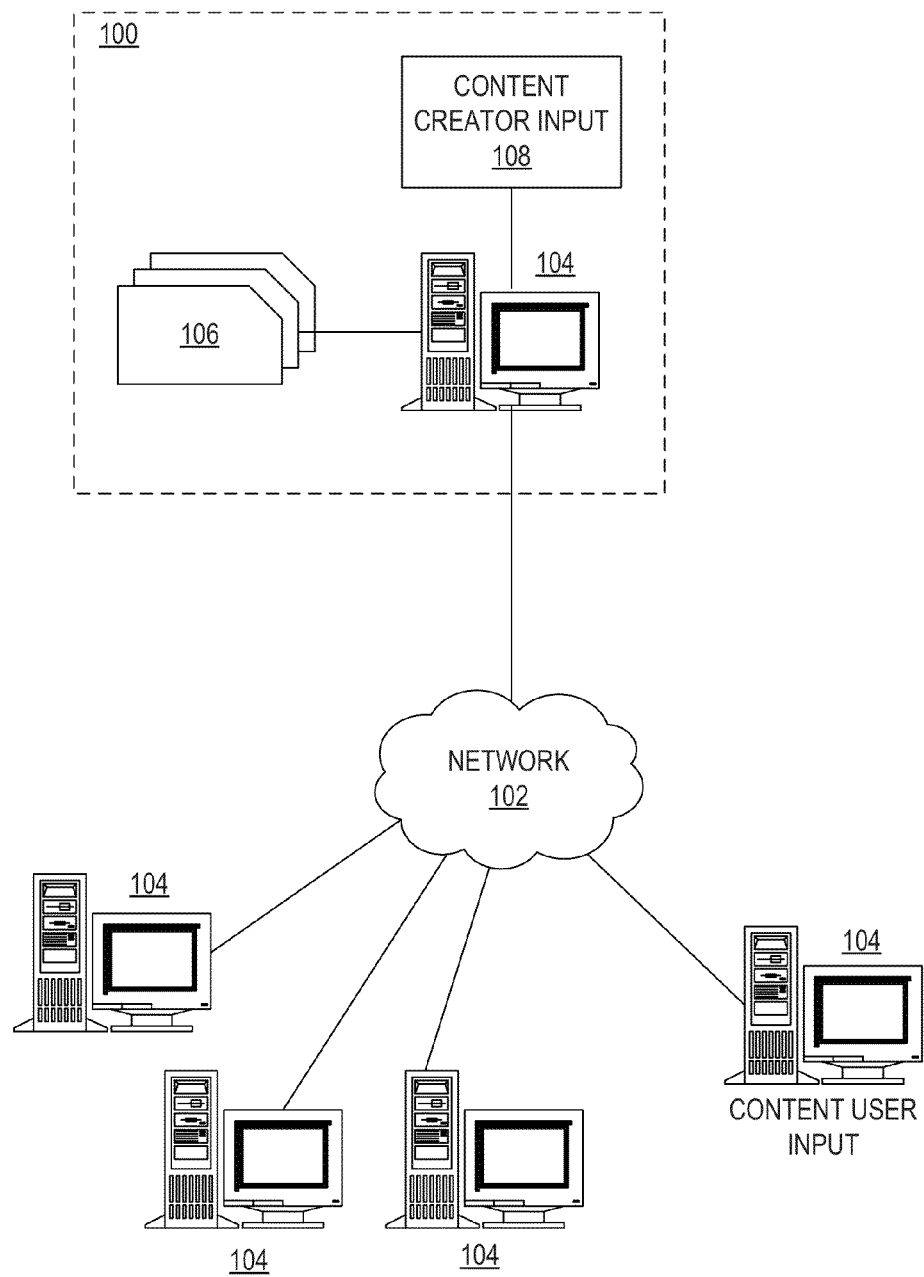
FIG. 1 depicts a schematic diagram of one illustrative embodiment of a question/answer (QA) system in a computer network.

In a question and answer (QA) system, such as the Watson™ QA system, vast amounts of content are searched in order to find the correct answer for an input question. Thus, the quality and accuracy of the answers provide by the QA system are directly related to the quality of the content the system uses to search for answers, i.e. the quality of content ingested by the QA system. The quality and value of the content that a QA system searches can vary and thus, if all content is treated equally, time can be lost and/or accuracy of answers can suffer from searching and relying on content that has lower relative value than other content. Thus, it would be beneficial to assist the searching and analysis of content performed by QA systems so that such searching and analysis can focus on portions of content that are relatively higher in value than other portions of content with regard to the quality and accuracy of the resulting answers generated from the content.

The illustrative embodiments provide mechanisms for rating the value of content used to generate candidate answers for input questions. These ratings can then be used to prioritize searching and analysis performed by QA systems so as to search/analyze relatively higher value portions of content prior to, or instead of, relatively lower value portions of content in a corpus of information. Various threshold values may be established for defining if and when portions of content having certain value measures are to be searched/analyzed by the QA system. Thus, in this way, the mechanisms of the illustrative embodiments dynamically identify the portions of content, content sources, and the like, that provide relatively higher value to the quality and accuracy of resulting answers and can dynamically adjust the prioritization of portions of content, content sources, and the like, that are searched/analyzed by the QA system.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. In order to provide a context for the description of the specific elements and functionality of the illustrative embodiments, FIGS. 1-5 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to clustering questions based on identified attributes of the questions for purposes of training the QA system and/or identifying a confidence that a subsequently submitted question is likely to be answered correctly based on how well the question matches a previously defined question cluster generated during training.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-5 are only examples and are not intended to state or imply any limitation with regard to the type of QA mechanisms with which the illustrative embodiments may be implemented. Many modifications to the example QA system shown in FIGS. 1-5 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, subsystems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use as part of a corpus of data with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to users in a ranked list of answers.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 2:
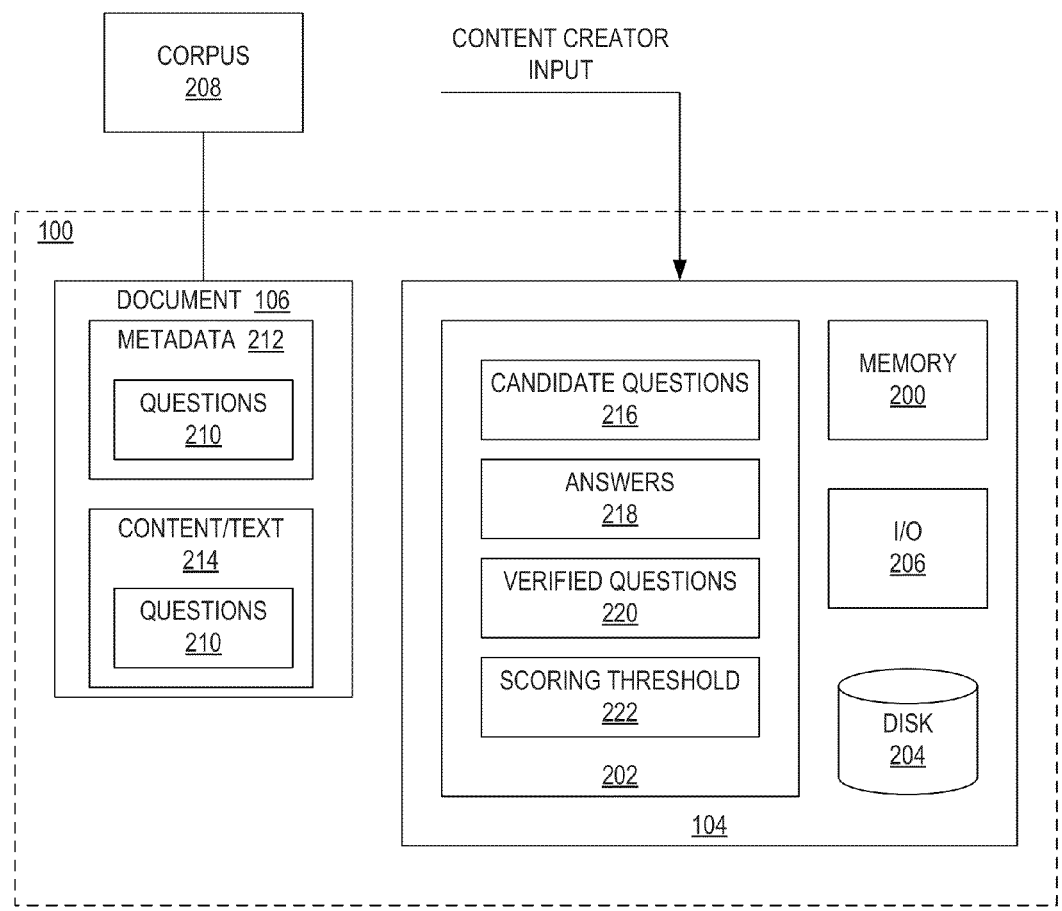
FIG. 2 depicts a schematic diagram of one embodiment of the QA system of FIG. 1.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to the illustrative embodiments describes in conjunction with the subsequent figures.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
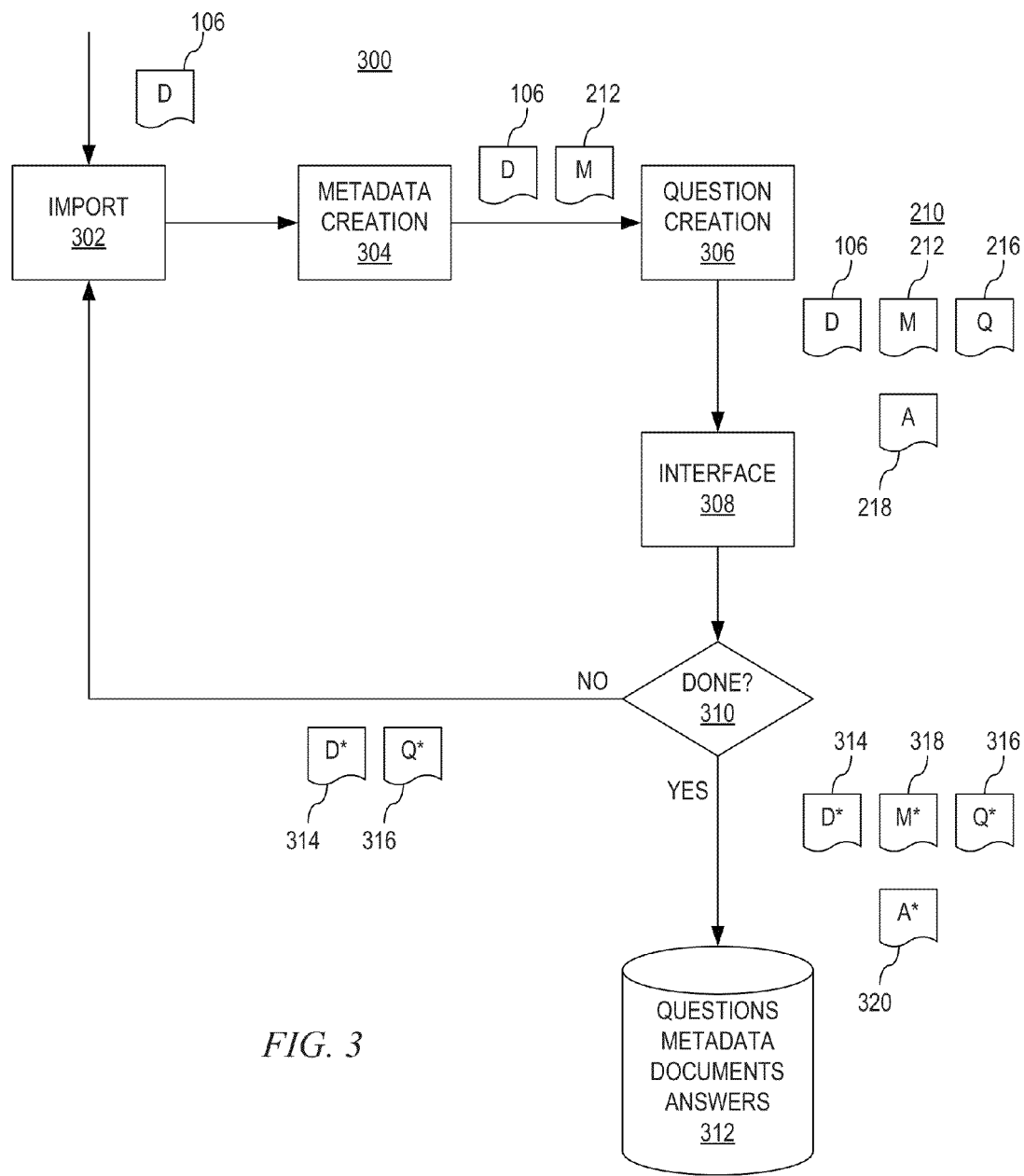
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

The above description illustrates the manner by which content creators may generate metadata for use by a QA system 100 when performing answer generation for input questions. As discussed above, the QA system 100 also is used to answer input questions submitted by users via one or more client computing devices. For example, in a healthcare domain, the QA system 100 may be utilized to receive questions directed to medical issues, such as diagnosis, treatment, and the like. The QA system 100 may process such input questions through a QA system analysis pipeline to evaluate the input question against a corpus of data/information, which may include documents or content having associated metadata as previously described above, unstructured documents, or the like, and generate one or more potential answers to the input question.

Figure 5:
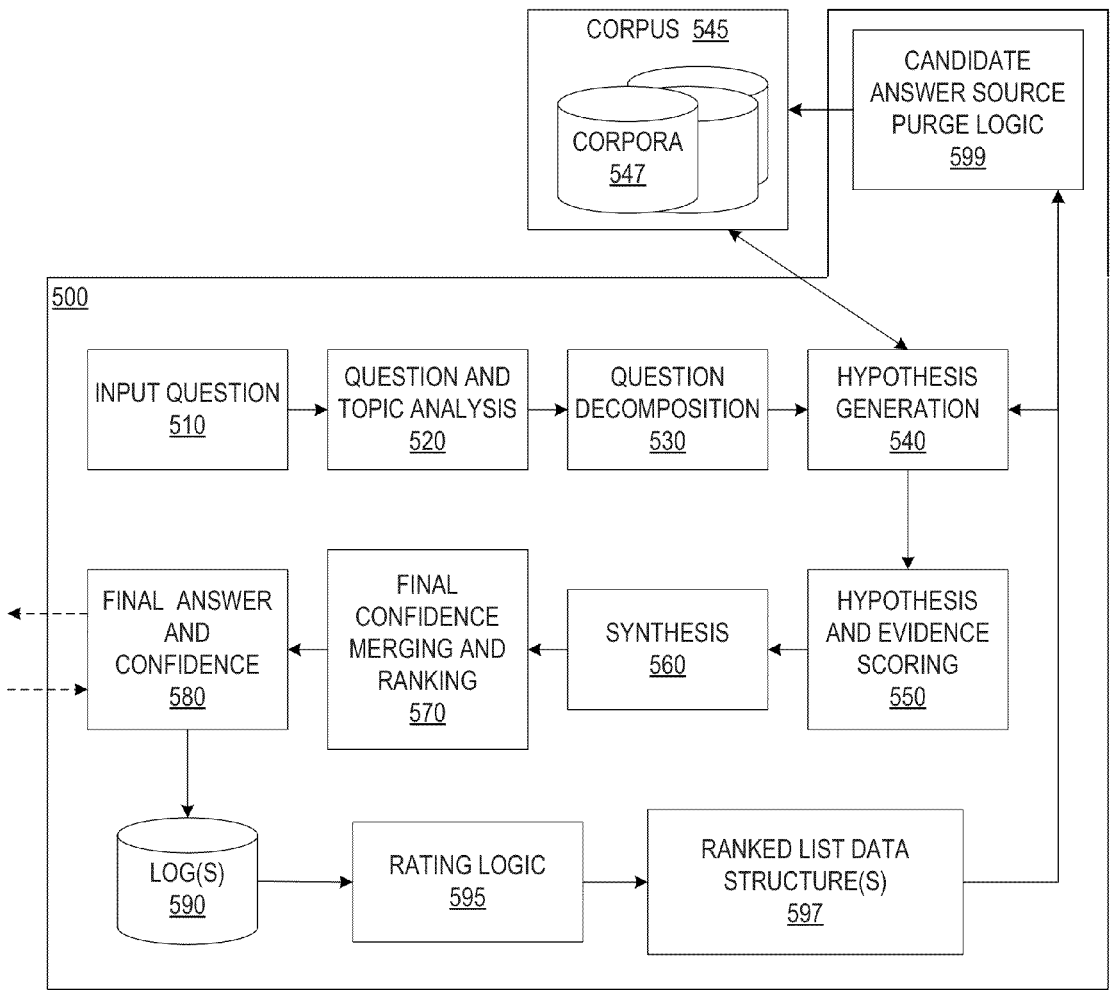
FIG. 5 is an example block diagram of a question and answer system analysis pipeline including candidate answer source rating logic in accordance with one illustrative embodiment.

FIG. 5 illustrates a QA system pipeline for processing an input question in accordance with one illustrative embodiment. As will be discussed in greater detail hereafter, the QA system pipeline in FIG. 5 is augmented to include logic for rating candidate answer sources, e.g., corpus, corpora, answer sources, documents, etc., and using the ratings of candidate answer sources to direct hypothesis generation operations. It should be appreciated that the stages of the QA system pipeline shown in FIG. 5 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. That is, a user may input, via a user interface, an input question for which the user wishes to obtain an answer, e.g., "Who are Putin's closest advisors?" In response to receiving the input question, the next stage of the QA system pipeline 500, i.e. the question and topic analysis stage 520, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Putin" may be identified as a proper name of a person with which the question is associated, "closest" may be identified as a word indicative of proximity or relationship, and "advisors" may be indicative of a noun or other language topic.

The identified major features may then be used during the question decomposition stage 530 to decompose the question into one or more queries that may be applied to the corpus of data/information 545 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information 545. That is, these various sources themselves, collections of sources, and the like, may represent different corpora 547 within the corpus 545. There may be different corpora 547 defined for different collections of documents based on various criteria depending upon the particular implementation. For example, different corpora may be established for different topics, subject matter categories, sources of information, or the like. As one example, a first corpora may be associated with healthcare documents while a second corpora may be associated with financial documents. Alternatively, one corpora may be documents published by the U.S. Department of Energy while another corpora may be IBM Redbooks documents. Any collection of content having some similar attribute may be considered to be a corpora 547 within the corpus 545.

The queries being applied to the corpus of data/information at the hypothesis generation stage 540 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 560, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 570 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, may be generated and output to the submitter of the original input question.

As mentioned above, the illustrative embodiments improve upon the operation of QA systems by providing mechanisms for rating portions of content, corpora, answer sources, and/or the like, with regard to quality and accuracy of the answers generated based on such portions of content, corpora, answer sources, and the like. The illustrative embodiments allow for the dynamic modification of the operation of a QA system based on the dynamic rating of such content, answer sources, and the like so as to dynamically focus the processing resources of the QA system on those portions of content, answer sources, and the like, whose ratings indicate that they are likely to generate high quality and highly accurate answers to input questions.

As shown in FIG. 5, the final answer and confidence scores stage 580 may be augmented to include logic for logging information about the portions of content, corpus, corpora, content sources, e.g., particular websites, document databases, electronic documents, publishers, or the like (referred to collectively as "answer sources"), and/or other granularities of answer sources the like, that were used in generating the one or more answers for the input question 510. This information may be stored in one or more log data structures 590 which are then processed to rate the various portions of content, corpus, corpora, answer sources, and/or the like. For purposes of the following description, it will be assumed that the information being logged and the ratings generated are performed with regard to particular corpora of information. However, it should be appreciated that the described mechanisms and methodologies may be performed with regard to any particular granularity of information including various corpus, various corpora within one or more corpus of information, various answer sources, various portions of content, e.g., documents, files, etc., or the like.

The final answer and confidence stage 580 may comprise logic that logs the corpus/corpora used to answer the input question 510, the portion of content used to answer the input question 510, the confidence score associated with the answer generated by the corpus/corpora and portion of content, information about the evidence gathered to support the answer, and other information about the reliability of the source of the portion of content, e.g., relative ratings of the source previously generated, user specified subjective ratings of the source, or the like. This information may be logged for each candidate answer generated that meets predetermined criteria for such logging. That is, one or more predetermined criteria may be established against which the characteristics of a candidate answer may be compared to determine if the candidate answer should have its information logged for later analysis. In one illustrative embodiment, these one or more predetermined criteria include a minimum confidence score value against which the confidence scores of the candidate answers are compared. If the confidence score for a candidate answer equals or exceeds this minimum confidence score value, then the information associated with the candidate answer is logged in one of the log data structures 590.

As mentioned above, there may be multiple log data structures 590 provided. In one illustrative embodiment, there may be a separate log data structure 590 for each domain handled by the QA system. That is, for example, the types of questions, i.e. the topics, subject matter, areas of interest, etc. (referred to as "domains"), may be separated into separate domains having separate question and topic analysis logic 520, separate corpora 547, and the like. In addition, separate log data structures 590 may be provided for each domain such that the information about candidate answers generated in response to input questions 510 may be logged in accordance with the determined domain of the input question 510. This allows for domain specific dynamic modification of the hypothesis generation 540 as described in greater detail hereafter.

In some illustrative embodiments, information about each of the candidate answers that is logged in the log data structure 590 may include information about whether the particular candidate answer was selected as the final correct answer during the final answer and confidence scoring stage 580 or not. That is, during the final confidence merging and ranking stage 570, multiple candidate answers may be present in the ranked listing generated, however a single final answer may be selected during the final answer and confidence scoring stage 580, leaving one or more candidate answers that were not selected as the final answer. Information about whether a candidate answer was selected as the final answer or not may be logged so as to provide an indication as to which corpus, corpora, portions of content, answer sources, and the like, more often result in providing the correct final answer or more often result in providing an incorrect final answer.

In addition, in some illustrative embodiments, rather than, or in addition to, providing a final answer that is selected by the QA system pipeline 500 to a user via their client computing device, the QA system pipeline 500 may present a ranked listing of the candidate answers, according to confidence scores, via a graphical user interface through which a user may provide user feedback input that identifies which of the candidate answers the user considers to be the most correct answer to the input question 510. The user feedback input may be received by the final answer and confidence scoring logic in stage 580 and used to store an indication in the log data structure 590 as to which candidate answer was correct and which other candidate answers were considered incorrect.

The log of information associated with candidate answers may be cumulative in that the log information may be collected for multiple input questions 510. Thus, for example, if the same corpora is used to generate a correct answer for multiple input questions, then the logged information may accumulate the value for number of times that the corpora provided the correct answer. Similarly, if the same corpora generates candidate answers for a plurality of input questions 510, but the candidate answers are not selected as the correct answer for these input questions 510, this value of the number of times the corpora generated an incorrect candidate answer may be likewise accumulated. Other logged information may also be accumulated over multiple iterations of the execution of the QA system pipeline 500 to answer various input questions.

The information logged in the log data structures 590 may be provided to rating logic 595 which processes the logged information to determine an appropriate rating value to be applied to the corpus, corpora, portion of content, answer source, and/or the like, based on the logged information. The rating logic 595 operates to rate and value documents, passages within documents, other evidence in support of the candidate answer that is logged in the log data structure 590, and the corpora/corpus itself. Various factors may be used to determine a final rating/value for such documents, passages within documents, other evidence, the corpora/corpus, and the like. These various factors may include, for example, how often a corpus/corpora is used to lead to the correct answer, how often a corpus/corpora is used to lead to an incorrect answer, how valuable the supporting evidence is in support of the candidate answer, how reliable the source of the candidate answer was with regard to the particular domain of the input question (e.g., if the domain of the input question 510 is medical treatments, then the New England Journal of Medicine is more reliable than a random blog post), where the supporting evidence came from (e.g., trade journal versus blog post), and other factors. One or more functions, relationships, equations, or the like may be used to calculate the rating/value for the documents, passages, corpus/corpora, answer source, or the like.

For example, one example of a function that may be used to calculate the rating/value for the documents, passages, corpus/corpora, answer source, or the like, may be to calculate ratio of a number of times a corpus gives an answer above 85% confidence to the number of times the corpus was accessed. Using this function as an example, assume that 10 medical questions are asked and each time the New England Journal of Medicine (NEJM) corpus and a Wikipedia corpus were used to search for the answers. Further, assume that 9 of the questions are answered correctly with a confidence greater than 85%. For the 9 answers, 7 of them came from the NEJM and 2 came from Wikipedia. Therefore, there is a $7/10$ or 70% ranking of the NEJM corpus and a $2/10$ or 20% ranking on the Wikipedia corpus for these types of medical questions. It should be appreciated that this is a simplified example and more complex ranking/rating algorithms and functions may be used without departing from the spirit and scope of the illustrative embodiments.

The ratings may be performed at various granularities with finer grain granularities contributing to more coarse grain granularity ratings. For example, a rating may be generated for a particular passage that was used to generate a candidate answer. This rating may be used in conjunction with ratings of other passages within the same document, calculated in a similar manner, to generate a rating for the document as a whole. Ratings for a plurality of documents within a corpora may be combined to generate a rating for the corpora and ratings for various corpora may be used to generate a rating for the corpus. Similarly, ratings for various passages, documents, and the like, associated with a same source of content may be combined to generate a rating for an answer source, for example. Alternatively, ratings may be generated for the corpus, corpora, document, answer source, passages, and the like (collectively referred to hereafter as "candidate answer sources"), independently based on the logged information for that granularity of source of candidate answers.

In one illustrative embodiment, one of logged values that may be accumulated is an average amount of time that a particular corpora, corpus, or answer source required to generate a candidate answer. This information may be used along with confidence score information to identify a tradeoff between confidence and processing time, as discussed hereafter. Thus, this information may be incorporated into the function, relationship, equation, etc. for calculating a rating for the particular corpora, corpus, or answer source, or may be used in a separate calculation used specifically for rating sources of candidate answers according to this processing time/confidence tradeoff. Hence, in some illustrative embodiments, multiple ratings may be generated for one or more granularities of candidate answer sources depending on the particular criteria desired. For example, one rating may be based on a criteria of processing time, another rating may be based on confidence scores, a third may be based on frequency of correct/incorrect answer generation, a fourth may be based on user feedback input indicating correctness/incorrectness of answer generation, and the like.

The ratings generated by the rating logic 595 may be accumulated or otherwise a function of the current and previous ratings generated by the rating logic 595 for the particular candidate answer source. In other words, the rating logic 595 may operate continuously, periodically, or in response to an event, such as a user input, number of submitted input questions 510 within a specified period of time, or the like. As such, ratings for candidate answer sources may be repeatedly calculated. New ratings for a candidate answer source may replace previously generated ratings or may be used on conjunction with the previously generated ratings by defining a function, relationship, equation, or the like to combine the new ratings with the previously generated ratings, e.g., taking an average of the ratings, using a weighted function that weights the new rating differently from the previous rating, or the like.

The ratings generated by the rating logic 595 for each of the granularities of candidate answer source, e.g., corpus, corpora, answer source, document, passage, etc., may be used to generate/update a ranked listing of candidate answer sources at that granularity for the particular domain of the input question 510. For example, for a particular domain having 10 different corpora 547, the rating logic 595 may be used to generate ratings for the various corpora 547 based on the logged information 590. These ratings may then be used to generate one or more ranked list data structures 597 for the domain that are ranked according to the generating ratings, e.g., the 10 different corpora 547 may be listed in descending order of overall rating values such that the highest rated corpora is listed first, followed by the second highest rated corporate, and so on. For example, a first ranked listing of corpora may be generated that lists the corpora in order of overall rating value as mentioned above while a second ranked listing of corpora may be generated that lists the corpora according to rating value based on processing time, a third ranked listing of corpora may be generated that lists the corpora according to rating value based on confidence score, etc. These ranked listings may be dynamically updated as the rating logic 595 periodically calculates the ratings for the various candidate answer sources, e.g., corpus, corpora, answer source, document, passage, etc.

The ranked listings of candidate answer sources may be input to the hypothesis generation stage 540 logic that uses these ranked listings to direct the application of queries against appropriate passages, documents, corpora, corpus, or the like. That is, the hypothesis generation logic of stage 540 is augmented by the mechanisms of the illustrative embodiments to prioritize the search for an answer to the input question 510 to focus on the candidate answer sources that are most likely to result in a valid candidate answer having a high confidence score. Thus, the hypothesis generation stage 540 may direct the application of queries to those corpora, documents, answer sources, or the like, having a ranking in one or more of the ranked listings of candidate answer sources that meet a predetermined criteria, e.g., the top 5 or 10 corpora in a ranked listing. The predetermined criteria may specify a combination of criteria for various ranked listings such that only the candidate answer sources meeting the combination of criteria are initially used during the search for candidate answers, e.g., the predetermined criteria may specify the top 5 corpora in the overall rating ranked listing and which also are in the top 10 corpora for the fastest processing ranked listing. The predetermined criteria may be different for different domains with the specific predetermined criteria that are applied by the hypothesis generation logic of stage 540 being selected based on the domain of the particular input question 510 that is being processed. Thus, based on predetermined criteria being used for the particular domain of the input question, and the ranked listings of candidate answer sources for the particular domain of the input question, the application of queries to candidate answer sources may be focused by the hypothesis generation logic of stage 540 to those candidate answer sources identified as being most likely to generate a valid candidate answer with high confidence score.

In some illustrative embodiments, the predetermined criteria for selecting the candidate answer sources to apply the queries to may be specified by preferences of a user that submitted the input question. For example, a user profile may be established by a user and registered with the QA system when the user first registers with the QA system as a valid user. This user profile, which may be updated periodically, may specify the preferences the user has with regard to speed of answering of input questions, desired levels of confidence in candidate answers, types of candidate answer sources the user wishes to include or exclude from consideration during question answering, and the like. This information in the user profile may specify criteria which may be used by the hypothesis generation logic of stage 540, along with the ranked listings of candidate answer sources, to select a subset of the corpus, corpora, candidate answer sources, documents, or the like, used to search for answers to an input question 510. For example, the user may specify that the user wishes to have questions processed with the fastest possible speed and that the user wishes to utilize candidate answer sources that have a reliability of above X, where X is some value indicative of a rating of the candidate answer source. As such, this predetermined criteria may be used to select candidate answer sources primarily based on processing time but which also have a rating above X on an overall rating listing.

The hypothesis generation logic of stage 540 may perform an initial operation for attempting to find an answer to the input question 510 by applying the queries generated by the question decomposition stage 530 to the candidate answer sources identified by the ranked listings and the predetermined criteria. The confidence scores associated with candidate answers generated as a result of this application of queries to the subset of candidate answer sources may be evaluated against predetermined thresholds to determine if a valid candidate answer with sufficient confidence is found. If not, the hypothesis generation logic of stage 540 may be allowed to expand the search of for an answer to additional candidate answer sources either further down in the ranked listings or not included in the ranked listings in an effort to find other possible sources for an answer when the candidate answer sources determined to be the most likely sources of valid answers are found to be lacking with regard to the specific input question 510. Thus, the use of the ranked listings of candidate answer sources is used as an initial filter of the candidate answer sources but this filter may be relaxed during subsequent iterations when it fails to produce a sufficiently correct answer to the input question 510.

In a further aspect of the illustrative embodiments, the ranked listings of candidate answer sources may be used by the candidate answer source purge logic 599 to periodically purge candidate answer sources from the corpus 545 used by the QA system pipeline 500. That is, for example, if a candidate answer source is found to not be included in one or more of the ranked listings 597 generated by the rating logic 595 over a specified period of time, then the candidate answer source may be removed from the corpus 545, or the particular corpora 547 for a domain. Other criteria may be established within the candidate answer source purge logic 599 for determining when a candidate answer source should be removed from the corpus based on the ranked listings 597 generated by the rating logic 595. For example, if a candidate answer source is not listed in the top 100 entries of one or more of the ranked list data structures within a specified period of time, for a particular domain, then the candidate answer source may be removed from the corpora 547 associated with that domain but may be moved to another corpora 547 not associated with that domain, such as a default corpora or the like. In this way, storage space and search time may be saved by eliminating candidate answer sources that have little likelihood of providing any valuable contribution to candidate answer generation.

Thus, the illustrative embodiments provide mechanisms for dynamically adjusting the operation of a QA system with regard to searching of candidate answer sources by rating the candidate answer sources, generating prioritized listings of candidate answer sources, and tailoring the application of queries to candidate answer sources based on the prioritized listings of candidate answer sources. The mechanisms of the illustrative embodiments improve the performance of a QA system by reducing processing time spent on applying queries to candidate answer sources that have low likelihood of producing candidate answers with high confidence, reduce the amount of memory consumed by limiting the corpus, corpora, and other candidate answer sources that must be loaded into memory for evaluation, and increase the accuracy of the QA system by focusing efforts on candidate answer sources that have been determined to be most likely to provide valid candidate answers with high confidence. Moreover, the mechanisms of the illustrative embodiments further provide for the saving of storage space and processing time by periodically purging the candidate answer sources that are determined to have very little likelihood of producing valid candidate answers with high confidence from the corpus of information used by the QA system.

Figure 6:
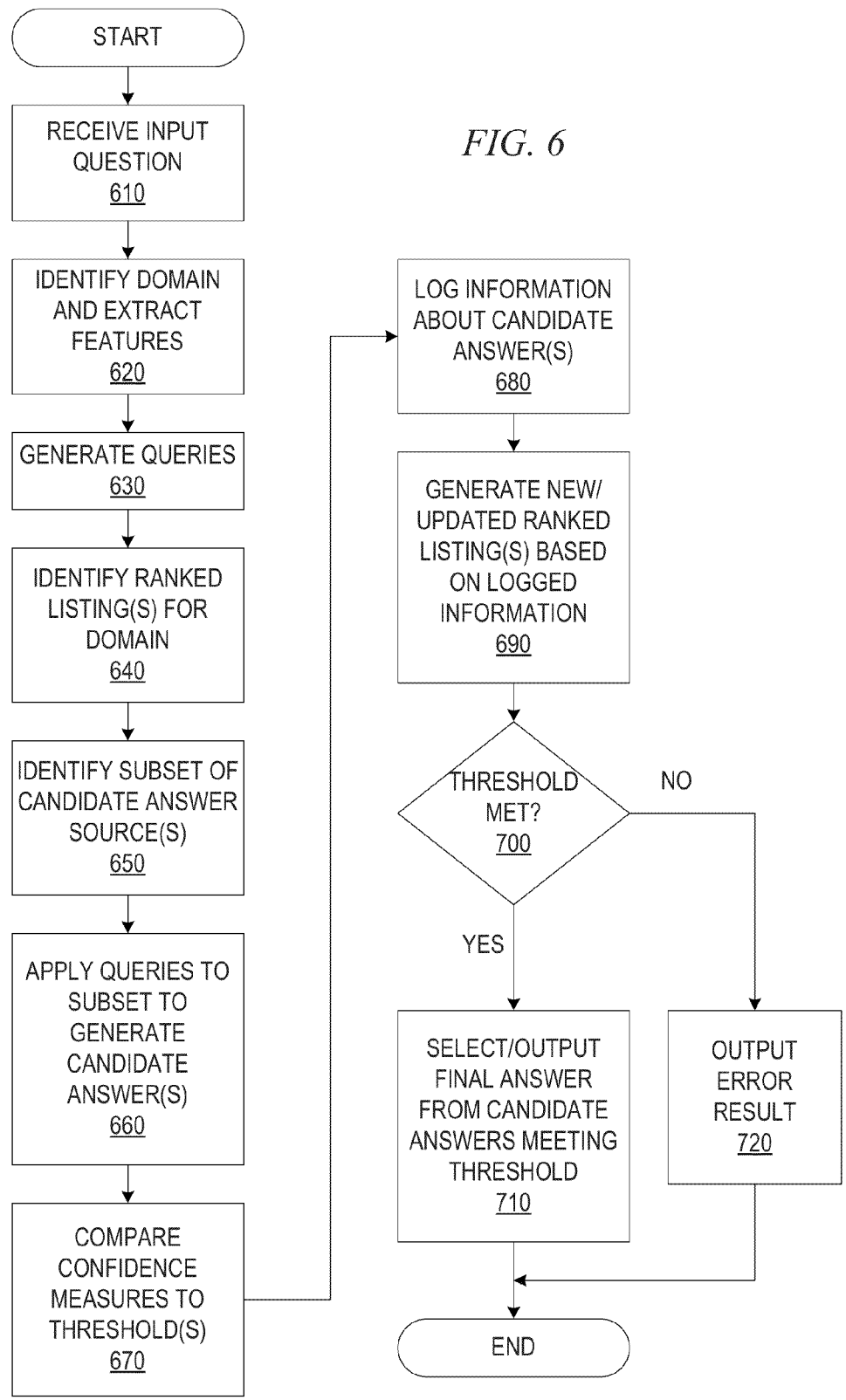
FIG. 6 is a flowchart outlining an example operation of an improved QA system with regard to rating candidate answer sources in accordance with one illustrative embodiment.

FIG. 6 is a flowchart outlining an example operation of an improved QA system with regard to rating candidate answer sources in accordance with one illustrative embodiment. As shown in FIG. 6, the operation starts by receiving an input question (step 610). The input question is parsed and analyzed to extract features from the input question (step 620). The extracted features are used to identify the domain of the input question and to generate one or more queries (step 630). One or more ranked listings of candidate answer sources for the identified domain of the input question are retrieved (step 640) and one or more predetermined criteria are applied to the one or more ranked listings to identify a subset of candidate answer sources to use for identifying an answer to the input question (step 650). The one or more predetermined criteria may be default criteria stored in the QA system, user defined criteria such as may be specified in a user profile, or the like.

The one or more queries are then applied to the subset of candidate answer sources to generate one or more candidate answers and corresponding confidence measures (step 660). The confidence measures are compared to one or more thresholds to identify candidate answers have a sufficiently high enough confidence measure (step 670). Information about the candidate answers is logged (step 680) and processed to generate new or updated ranked listings of candidate answer sources for the domain of the input question (step 690). The new or updated ranked listings of candidate answer sources may be used with the processing of subsequently submitted input questions, such as in step 640 above.

A determination is made as to whether any candidate answer is identified that meets the predetermined criteria of having a sufficiently high enough confidence score (step 700). If so, then a final answer and corresponding confidence score are selected from the candidate answers having a sufficiently high enough confidence score, e.g., the candidate answer having the highest confidence score may be selected (step 710). If not, then an error result may be generated and output to the submitter of the input question (step 720). The error result may list the candidate answers found and their confidence scores with an indication that none of the candidate answers were found to be sufficiently correct, may simply indicate that no answer could be found, or otherwise inform the user of the inability of the QA system to generate a sufficiently correct result. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for dynamically selecting a subset of candidate answer sources for use by a question and answer (QA) system implemented by the data processing system, the method comprising:
   receiving, by the QA system implemented by the data processing system, an input question for which an answer is sought;
   generating, by the QA system, one or more queries based on the input question;
   selecting, by the QA system, a subset of candidate answer sources, from a group of candidate answer sources, based on a ranked listing of candidate answer sources, wherein the ranked listing of candidate answer sources is generated based on characteristics of previous candidate answers generated by the QA system for previously input questions;
   applying, by the QA system, the one or more queries to the subset of candidate answer sources;
   generating, by the QA system, at least one candidate answer for the input question based on results of applying the one or more queries to the subset of candidate answer sources;
   logging, for the previously input questions, in entries of at least one log data structure, the characteristics of previous candidate answers generated by the QA system, wherein the characteristics of each previous candidate answer comprises an identification of a candidate answer source from which the candidate answer was generated and a confidence score associated with the candidate answer; and
   generating the ranked listing of candidate answer sources based on the entries in the at least one log data structure.

2. The method of claim 1, wherein the characteristics of each previous candidate answer further comprises an indication of a portion of content provided by the candidate answer source that was used to generate the candidate answer and information about evidence gathered to support the answer.

3. The method of claim 1, wherein the characteristics of each previous candidate answer further comprises at least one of a relative rating of the candidate answer source previously generated or a user specified subjective rating of the candidate answer source.

4. The method of claim 1, wherein the at least one log data structure comprises a plurality of log data structures with at least one log data structure for each domain of a plurality of domains of subject matter types handled by the QA system.

5. The method of claim 1, wherein the characteristics of each previous candidate answer further comprises an identifier indicating whether or not the candidate answer was selected as a final answer for a previously input question.

6. The method of claim 1, wherein logging the characteristics of previous candidate answers generated by the QA system further comprises:
   presenting an output of a ranked listing of candidate answers for a previously input question;
   receiving a user feedback input based on the output of the ranked listing of candidate answers indicating a user's indication of a level of correctness of one or more of the candidate answers in the ranked listing of candidate answers; and
   logging the user feedback input for the one or more candidate answers in corresponding entries of the at least one log data structure.

7. The method of claim 1, wherein generating the ranked listing of candidate answer sources based on the entries in the at least one log data structure comprises:
   generating, for each candidate answer source, a rating of the candidate answer source based on information in the entries of the at least one log data structure for candidate answers generated by the candidate answer source; and
   generating the ranked listing of candidate answer sources based on a relative comparison of the ratings of each of the candidate answer sources.

8. The method of claim 7, wherein generating a rating of the candidate answer source comprises calculating a rating based on one or more factors, wherein the one or more factors comprise at least one of a value indicating how often the candidate answer source is used to lead to a correct candidate answer for previously input questions, a value indicating how often the candidate answer source is used to lead to an incorrect candidate answer for previously input questions, a value indicating how valuable supporting evidence is in support of candidate answers generated by the candidate answer source, a value indicating how reliable the candidate answer source was with regard to particular domains of previously input questions, and a value indicative of a reliability of a source of supporting evidence for a candidate answer generated by the candidate answer source.

9. The method of claim 7, wherein generating a rating of the candidate answer source comprises calculating a rating as a ratio of a number of times the candidate answer source generated a candidate answer having an associated confidence score above a predetermined threshold confidence score, to a number of times the candidate answer source was accessed to generate a candidate answer for a previously input question.

10. The method of claim 7, wherein generating the rating for the candidate answer source comprises generating the rating for the candidate answer source based on an average amount of time that the candidate answer source required to generate candidate answers for the previously input questions.

11. The method of claim 7, wherein generating the rating for the candidate answer source comprises generating a plurality of ratings for the candidate answer source, each rating corresponding to different rating criteria.

12. The method of claim 1, wherein the previous candidate answers are candidate answers generated for previously input questions that have associated confidence scores that meet a minimum confidence score value.

13. The method of claim 1, selecting a subset of candidate answer sources, from a group of candidate answer sources, based on a ranked listing of candidate answer sources, further comprises:
   generating priority values associated with candidate answer sources in the group of candidate answer sources based on one or more prioritization criteria and ratings associated with the candidate answer sources in the group of candidate answer sources, wherein the one or more queries are applied to the subset of candidate answer sources according to priority values associated with candidate answer sources such that the one or more queries are applied to higher priority value candidate answer sources first before applying the one or more queries to lower priority value candidate answer sources.

14. The method of claim 13, wherein the subset of candidate answer sources comprises candidate answer sources in the group of candidate answer sources whose priority values meet at least one predetermined priority level.

15. The method of claim 14, wherein the at least one predetermined priority level comprises a combination of priority levels for a plurality of ranked listings of candidate answer sources.

16. The method of claim 14, wherein there is a different predetermined priority level for each of a plurality of domains of subject matter handled by the QA system.

17. The method of claim 14, wherein the at least one predetermined priority level comprises a user specified priority level.

18. A computer program product comprising a non-transitory computer readable storage medium having a computer readable program stored therein, wherein the computer readable program, when executed on a data processing system, causes the data processing system to:
   receive, by a Question and Answer (QA) system implemented by the data processing system, an input question for which an answer is sought;
   generate, by the QA system, one or more queries based on the input question;
   select, by the QA system, a subset of candidate answer sources, from a group of candidate answer sources, based on a ranked listing of candidate answer sources, wherein the ranked listing of candidate answer sources is generated based on characteristics of previous candidate answers generated by the QA system for previously input questions;
   apply, by the QA system, the one or more queries to the subset of candidate answer sources;
   generate, by the QA system, at least one candidate answer for the input question based on results of applying the one or more queries to the subset of candidate answer sources;
   log, for the previously input questions, in entries of at least one log data structure, the characteristics of previous candidate answers generated by the QA system, wherein the characteristics of each previous candidate answer comprises an identification of a candidate answer source from which the candidate answer was generated and a confidence score associated with the candidate answer; and
   generate the ranked listing of candidate answer sources based on the entries in the at least one log data structure.

19. An apparatus comprising:
   a processor; and
   a memory coupled to the processor, wherein the memory comprises instructions which, when executed by the processor, cause the processor to:
   receive, by a Question and Answer (QA) system executing on the processor, an input question for which an answer is sought;
   generate, by the QA system, one or more queries based on the input question;
   select, by the QA system, a subset of candidate answer sources, from a group of candidate answer sources, based on a ranked listing of candidate answer sources, wherein the ranked listing of candidate answer sources is generated based on characteristics of previous candidate answers generated by the QA system for previously input questions;
   apply, by the QA system, the one or more queries to the subset of candidate answer sources;
   generate, by the QA system, at least one candidate answer for the input question based on results of applying the one or more queries to the subset of candidate answer sources;
   log, for the previously input questions, in entries of at least one log data structure, the characteristics of previous candidate answers generated by the OA system, wherein the characteristics of each previous candidate answer comprises an identification of a candidate answer source from which the candidate answer was generated and a confidence score associated with the candidate answer; and
   generate the ranked listing of candidate answer sources based on the entries in the at last one log data structure.

* * * * *